United States Patent Office 3,538,117
Patented Nov. 3, 1970

3,538,117
2,3,4,4 - TETRAHALOBICYCLO[3,2,1]OCTA - 2,6-DIENES; 2,3,4,5 - TETRAHALOBICYCLO[3,2,2]-NONA-2,6-DIENES AND 2,3,4,4-TETRAHALO-8-OXABICYCLO[3,2,1]OCTA - 2,6 - DIENES AND PROCESS FOR MAKING SAME
Stephen W. Tobey, Sudbury, Mass., and David C. F. Law, Midland, Mich., assignors to The Dow Chemical Company, Midland, Mich., a corporation of Delaware
No Drawing. Filed Mar. 7, 1968, Ser. No. 711,189
Int. Cl. C07d 7/10
U.S. Cl. 260—345.1                                    9 Claims

ABSTRACT OF THE DISCLOSURE

New 2,3,4,4 - tetrahalobicyclo[3,2,1]octa - 2,6-dienes; 2,3,4,4-tetrahalobicyclo[3,2,2]nona-2,6-dienes and 2,3,4,4-tetrahalo-8-oxabicyclo[3,2,1]octa - 2,6-dienes, useful as bactericides and fungicides, and a new method for producing them which comprises reacting a tetrahalocyclopropene with either cyclopentadiene, cyclohexadiene or furan at a temperature of from 0° to 110° C. to obtain the 2,3,4,4-tetrahalobicyclo[3,2,1]octa - 2,6-dienes; 2,3,4,4-tetrahalobicyclo[3,2,2]nona-2,6-dienes or the 2,3,4,4- tetrahalo-8-oxabicyclo[3,2,1]octa-2,6-dienes, respectively.

BACKGROUND OF THE INVENTION

Investigation of the reactions between alkyl and aryl substituted cyclopropenes with cyclic and open chain 1,3-dienes have shown that 3,3-disubstituted cyclopropenes fail totally to form Diels-Alder adducts with any diene. These results have been ascribed to a strong preference for cyclopropene endo adduction, along with extreme sensitivity of the transition state to the steric size of the cyclopropene 3-substituent which must be syn to the diene.

The present inventors have discovered that the tetrahalocyclopropenes undergo facile, 1,4-addition to the cyclopentadiene, cyclohexadiene and furan despite the large halogen substituents. Furthermore, it has been unexpectedly discovered that tetrabromocyclopropene reacts more rapidly than tetrachlorocyclopropene and that both of these tetrahalocyclopropenes are more reactive than their counterparts having 3,3-difluorosubstitution. It has further been discovered that in addition to affecting the rates of the Diels-Alder adduct formation, the 1,4 addition of a tetrahalocyclopropene to cyclopentadiene, cyclohexadiene or furan results in the formation of highly strained tricyclic cyclopropyl adducts corresponding to the formula

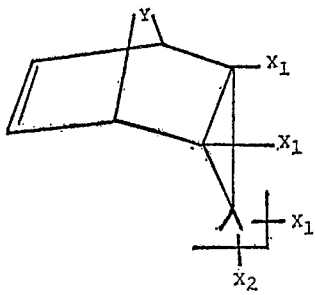

wherein Y represents methylene, ethylene or oxygene; $X_1$ represents chlorine or bromine and $X_2$ represents chlorine, bromine or fluorine, with $X_2$ representing fluorine only when $X_1$ represents chlorine.

This highly strained adduct undergoes immediate endo halogen ionization with disrotatory opening of the three-membered ring to yield the new 2,3,4,4-tetrahalobicyclo [3,2,1]octa - 2,6 - dienes; 2,3,4,4-tetrahalobicyclo[3,2,2] nona-2,6-dienes and 2,3,4,4-tetrahalo-8-oxabicyclo[3,2,1]-2,6-dienes of the present invention. This skeletal rearrangement involving the stereo-specific ionization of the labile halide occurs only when the halogen syn to the double bond is chlorine or bromine.

SUMMARY OF THE INVENTION

The new 2,3,4,4-tetrahalobicyclo[3,2,1]octa-2,6-dienes; 2,3,4,4-tetrahalobicyclo[3,2,2]nona-2,6-dienes and 2,3,4,4-tetrahalo-8-oxabicyclo[3,2,1]-2,6-dienes of the present invention correspond to formula

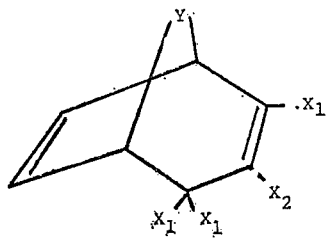

In the present specification and claims, Y represents methylene, ethylene or oxygen, $X_1$ represents chlorine or bromine and $X_2$ represents chlorine, bromine or fluorine, with $X_2$ representing bromine only when $X_1$ represents bromine. For the sake of convenience, the term 2,3,4,4-tetrahalobicyclo-2,6-dienes will be employed in the present specification to designate the new compounds of the present invention.

The new compounds of the present invention are oils or crystalline solids which are soluble in most common organic solvents and only slightly soluble in water. The new 2,3,4,4-tetrahalobicyclo[3,2,1]octa-2,6-dienes; 2,3,4,4-tetrahalobicyclo[3,2,2]nona-2,6-dienes and 2,3,4,4-tetrahalo-8-oxabicyclo[3,2,1]octa-2,6-dienes of the present invention are useful as bactericides and fungicides for the kill and control of various bacterial and fungal organisms such as *Staphylococcus aureus, Candida albicans, Salmonella typhosa, Candida pelliculosa, Aspergillus terreus, Trichophyton mentagrophytes* (the causative organism of athletes foot) and *Bacillus subtilis*.

In accordance with the new process of the present invention, the new 2,3,4,4-tetrachalobicyclo-2,6-dienes corresponding to the formulas

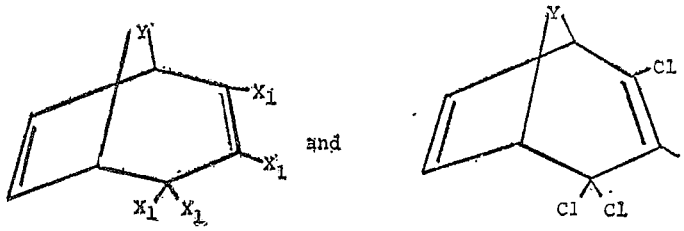

wherein all $X_1$ are identical, are prepared by reacting cyclopentadiene, 1,9-cychohexadiene or furan with a tetrahalocyclopropene. The term tetrahalocyclopropene as employed in the present specification and claims corresponds to the formula

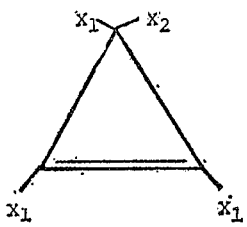

wherein $X_1$ and $X_2$ are the same except when $X_2$ is fluorine, $X_1$ is chlorine. Representative tetrahalocyclopropenes are tetrachlorocyclopropene, tetrabromocyclopropene and 1,2,3-trichloro-3-fluorocyclopropene.

The process of the present invention proceeds readily when carried out in an excess of either reactant as reaction medium; however, in a convenient embodiment, the reaction is carried out in an inert organic solvent as reaction mixture. Representative inert organic solvents include various aliphatic and aromatic hydrocarbons and ethers such as carbon tetrachloride, chloroform, hexane, benzene, toluene, diethyl ether, petroleum ethers, tetrahydrofuran and the like. To obtain optimum yields of the desired product, it is desirable that the reaction mixture be substantially free of water. While the presence of a small amount of water does not impair the yield of the desired product, the presence of water in amounts substantially greater than 3 mole percent with respect to the cyclopentadiene, cyclohexadiene or furan reactant causes side reactions with an attendant decrease in the yield of the desired product. Laboratory grade reagents which often contain small amounts of water can be employed satisfactorily without additional drying.

The process of the present invention is generally carried out at a temperature of from 0° to 110° C. However, when employing certain of the reactants, narrower temperature ranges are preferred. In carrying out the reaction between cyclopentadiene and the tetrahalocyclopropene without the use of an inert solvent as reaction medium, the reaction is carried out at temperatures in the range of from 0° to 25° C. At temperatures substantially greater than 25° C., cyclopentadiene dimerizes very rapidly. However, when cyclopentadiene and a tetrahalocyclopropene are reacted in an inert organic solvent as reaction medium, the reaction can be carried out at a temperature of from 0° to 110° C. When furan is reacted with a tetrahalocyclopropene, optimum yields of the desired 2,3,4,4-tetrahalobicyclo-2,6-diene are obtained when the reaction is carried out at temperatures between 50° and 100° C. When tetrabromocyclopropene is employed as a reactant and optimum yields are desired, it is preferred that the reaction be carried out at temperatures below about 80° C. If the reaction is carried out at temperatures substantially in excess of 80° C., the yield of the 2,3,4,4-tetrahalocyclo-2,6-diene product is decreased by undesirable side reactions. The temperature of the reaction mixture is maintained within the reaction temperature range for a period of from several hours to several days; with the longer reaction times being employed at the lower temperatures. The process of the present invention is carried out under atmospheric or superatmospheric pressure with the use of superatmospheric pressure being particularly desirable when the reaction is being carried out at a temperature greater than the boiling temperature of one of the components or of the reaction medium. In addition, the reaction can be carried out under an atmosphere of inert gases such as nitrogen, helium, argon or the like.

Good yields of the desired product are obtained by employing the reactants in from substantially equimolar proportions to proportions wherein one of the reactants is present in a 5-fold excess with respect to the other reactant. While the reaction proceeds smoothly when either reactant is present at greater than a 5 to 1 molar ration, such large excesses are uneconomical and, therefore, generally undesirable. However, such large excesses do not adversely affect the yield of the desired product. When employing cyclopentadiene or cyclohexadient as reactants, a small amount of a free radical polymerization inhibitor such as 2,6 - di - t - butyl-p-methylphenol or the like can be added to the reaction mixture.

In carrying out the process of the present invention, the tetrahalopropene and cyclopentadiene or cyclohexadiene or furan are admixed and the resulting mixture is maintained at temperatures within the desired temperature range for a period of time. Following the reaction period, the desired product is separated from the reaction mixture by conventional procedures. When tetrachlorocyclopropene or tetrabromocyclopropene are employed as reagents, the desired product can be isolated by conventional procedures. In a convenient procedure the reaction mixture is distilled under reduced pressure to remove the low boiling constituents and obtain the desired product as a residue. This product residue is then employed as herein described or further purified by such conventional procedures as washing, recrystallization or distillation. However, when 1,2,3 - trichloro - 3 - fluorocyclopropene is reacted with cyclopentadiene, cyclohexadiene or furan, two tricyclic compounds are formed. In one of these compounds the chlorine in the 3 position is syn to the double bond (Formula I). The other compound is identical in structure to Formula I except that the fluorine in the 3 position is syn to the double bond. When the fluorine rather than the chlorine in the 3 position is syn to the double bond, the highly strained adduct does not under endo halogen ionization; thus there is no skeletal rearrangement leading to the formation of a 2,3,4,4 - tetrahalobicyclo - 2,6 - diene, Therefore, following the reaction period the reaction mixture contains an unrearranged compound and the desired 2,4,4 - trichloro-3-fluorobicyclo[3,2,1]octa - 2,6 - diene; 2,4,4 - trichloro - 3 - fluorobicyclo[3,2,2]nona-2,6-diene or 2,4,4 - trichloro - 3 - fluoro-8-oxobicycol[3,2]octa-2,6-diene product. The components of the reaction mixture are separated by gas chromatography at a temperature of from 125° to 150° C., using for example a QF–1 fluorosilicone (Dow Corning) stationary phase column. Following the separation procedure, the desired products are identified by elemental analysis and by NMR and infrared spectral analysis.

The new compounds of the present invention corresponding to the formula

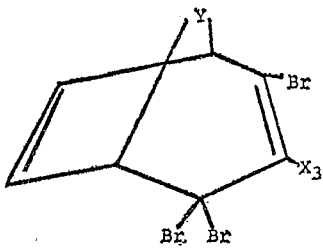

wherein $X_3$ represents chlorine or fluorine, are prepared by reacting boron tribromide with a 2,4,4 - trichloro-3-halobicyclo-2,6-diene corresponding to the formula

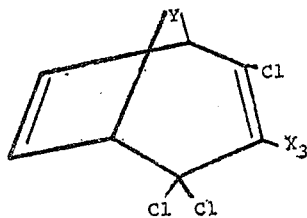

Representative 2,4,4 - trichloro-3-halobicyclo-2,6-diene starting materials prepared in accordance with the teachings of this specification include 2,3,4,4-tetrachlorobicyclo[3,2,1]octa-2,6-diene; 2,3,4,4-tetrachloro - 8 - oxabicyclo[3,2,1]octa-2,6-diene; 2,4,4-trichloro - 3 - fluoro-8 - oxabicyclo[3,2,1]octa - 2,6 - diene; 2,4,4-trichloro-3-fluorobicyclo[3,2,1]octa - 2,6 - diene; 2,3,4,4-tetrachlorobicyclo[3,2,2]nona-2,6-diene and 2,4,4-trichloro-3-fluorobicyclo[3,2,2]nona-2,6-diene.

In carrying out the reaction, the reactants are dispersed in an inert organic solvent such as chloroform or carbon tetrachloride as the reaction medium. The reaction between the boron tribromide and 2,4,4-trichloro-3-halobicyclo-2,6-diene proceeds readily at a temperature of from 30° to 50° C. with the production of the desired product and the gaseous boron chloride by-product. The temperature of the reaction mixture is maintained within the reaction temperature range for from about ½ to about 1 hour. Following the reaction period, the reaction mixture is poured into ice water whereupon the mixture separates into an aqueous and an organic phase. The organic phase is separated by decantation, dried and distilled under reduced pressure to remove the low boiling constituents and obtain the desired product as a solid residue or viscous oil. The solid or oily product thus obtained can be employed as a bactericidal or fungicidal agent or further purified by recrystallization or distillation before being so employed.

SPECIFIC EMBODIMENTS

The following examples of the present invention are merely illustrative and are not deemed to be limiting.

Example 1

Tetrachlorocyclopropene (1.5 grams, 8.4 mmoles) and freshly distilled cyclopentadiene (1.1 grams, 16 mmoles) were dispersed in 2 milliliters of carbon tetrachloride. The resulting reaction mixture was maintained at room temperature for two days. Following the reaction period the solvent and unreacted cyclopentadiene were removed in vacuo to obtain a solid residue. The solid residue was recrystallized from petroleum ether (B.P. 30–60° C.) to obtain the 2,3,4,4 - tetrachlorobicyclo[3,2,1]octa - 2,6-diene product as a crystalline solid melting at 90° C. The product yield obtained was 95 percent of theoretical based upon tetrachlorocyclopropene.

Example 2

Freshly distilled cyclopentadiene (0.5 gram, 8 mmoles) and tetrabromocyclopropene (1.5 grams, 4.2 mmoles) were dispersed in 2 milliliters of carbon tetrachloride and the resulting reaction mixture allowed to remain at 25° C. for two days. Following the reaction period, the reaction mixture was distilled under reduced pressure to remove the low boiling constituents and obtain a solid residue. This solid residue was repeatedly recrystallized from petroleum ether (B.P. 30–60° C.) to obtain the 2,3,4,4 - tetrabromobicyclo[3,2,1]octa - 2,6 - diene product as a crystalline solid melting at 134–135° C. (yield 90 percent of theoretical based upon tetrabromocyclopropene).

Example 3

Furan (1.1 gram, 16 mmoles) and tetrachlorocyclopropene (1.5 grams, 8.4 mmoles) were dispersed in 2 milliliters of carbon tetrachloride and the resulting reaction mixture placed in a reaction tube and the tube sealed. The sealed tube and contents were heated at 80° C. for 18 hours. Following the reaction period, the reaction mixture was removed from the reaction tube and distilled under reduced pressure to remove the low boiling constituents and obtain an oily residue. Upon tituration with petroleum ether, the oily residue yielded a crystalline solid product which was further purified by recrystallization from petroleum ether. The recrystallized 2,3,4,4-tetrachloro - 8 - oxabicyclo[3,2,1]octa-2-6-diene product melted at 59–60° C. (yield 92 percent of theoretical based upon tetrachlorocyclopropene).

Example 4

Tetrabromocyclopropene (1.5 grams, 4.2 mmoles) and furan (0.5 gram, 8 mmoles) were dispersed in 2 milliliters of carbon tetrachloride. The resulting reaction mixture was placed in a reaction tube which was sealed and the reaction tube and contents heated at 80° C. for 18 hours. Following the reaction period, the reaction mixture was filtered to remove the black precipitate which had formed during the reaction period, and the filtrate distilled at reduced pressure to remove the low boiling constituents and obtain an oily residue. This oily residue was titurated with petroleum ether to obtain a crystalline solid product which was separated by filtration and further purified by recrystallization from petroleum ether. The recrystallized 2,3,4,4-tetrabromo - 8 - oxabicyclo[3,2,1] octa-2,6-diene product was found to melt at 121–122° C.

Example 5

Tetrachlorocyclopropene was mixed with freshly distilled cyclopentadiene and the resultant mixture maintained at a temperature of 4° C. for two days. During the reaction period, the solid 2,3,4,4-tetrachloro[3,2,1] octa-2,6-diene product crystallized in the reaction mixture. A portion of the crystalline product was removed from the reaction flask and subjected to nuclear magnetic resonance spectra analysis. The NMR spectrum confirmed the identity of the crystalline product as being identical to the compound obtained in Example 1.

In a similar low temperature experiment, tetrabromocyclopropene was dispersed in carbon tetrachloride and the resulting dispersion was mixed with freshly distilled cyclopentadiene. The reaction mixture thus prepared was maintained at a temperature of 4° C. for two days. During the reaction period, crystals of 2,3,4,4-tetrabromobicyclo[3,2,1]octa-2,6-diene formed in the reaction mixture. This crystalline product was recovered from the reaction mixture and its nuclear magnetic resonance spectrum found to be identical to the NMR spectrum of the product obtained in Example 2.

Example 6

Tetrachlorocyclopropene (7.5 grams, 42.1 mmoles) was dissolved in 30 milliliters of carbon tetrachloride. This solution was then placed in a 250 milliliter, three-necked flask equipped with a stirrer, a reflux condensor, a nitrogen inlet and dropping funnel. Air was purged from the reaction flask by the continuous addition of nitrogen. Once the nitrogen atmosphere was established, cyclopentadiene (4.8 grams, 72.8 mmoles) was added slowly dropwise by means of the dropping funnel over a period of 20 minutes. The reaction mixture was maintained under a nitrogen atmosphere and gently heated over a steam bath for 1½ hours. Following the heating period the reaction mixture was then allowed to stand at room temperature under nitrogen for two days. The reaction mixture then was distilled under reduced pressure to obtain an oily residue which upon stirring with petroleum ether yields crystals of 2,3,4,4-tetrachlorobicyclo[3,2,1]-octa-2,6-diene (melting point 90° C.).

Example 7

1,2,3-trichloro-3-fluorocyclopropene (1.5 grams, 9.3 mmoles), furan (1.5 grams, 22 mmoles) and carbon tetrachloride (2 milliliters) were added to a reaction tube and the tube sealed. The tube and contents were then heated at 80° C. for 18 hours. Following the reaction period, the reaction mixture was filtered and the filtrate distilled under reduced pressure to obtain an oily product residue which dissolved in carbon tetrachloride and analyzed by NMR spectral analysis. The NMR spectrum established that the reaction mixture was composed of 2,3,4 - trichloro - 3 - fluoro - 8 - oxatricyclo[3,2,1,0$^{2,4}$] octa-6-ene and 2,4,4 - trichloro - 3 - fluoro - 8 - oxabicyclo [3,2,1]octa-2,6-diene in the ratio of 1.5:1. The 2,4,4-trichloro - 3 - fluoro - 8 - oxabicyclo[3,2,1]octa - 2,6-diene in the ratio of 1.5:1. The 2,4,4-trichloro-3-fluoro-8-oxabicyclo[3,2,1]octa-2,6-diene product in CCl$_4$ solution showed equal area multiplet vinyl proton H$^1$ resonances at 6.31 and 6.38 p.p.m., plus equivalent area multiplet methine resonances at 4.80 and 5.23 p.p.m. downfield from internal tetramethylsilane standard. The apparent vinyl-methine proton coupling constants were both 2 Hz. (c.p.s.), and the vinyl proton-vinyl proton coupling constant 6 Hz. The F$^{19}$ NMR spectrum in CCl$_4$ solution showed a triplet resonance at 127.6 p.p.m. upfield from internal fluorotrichloromethane standard with 7 Hz. coupling to the methine protons.

The following new compounds of the present invention are prepared in accordance with the procedure set forth in Example 7:

1,2,3-trichloro - 3 - fluorocyclopropene and cyclopentadiene are reacted together in hexane to produce 2,4,4-trichloro-3-fluorobicyclo[3,2,1]octa - 2,6 - diene (molecular weight 227.3).

1,2,3-trichloro-3-fluorocyclopropene and cyclohexadiene are reacted together in benzene to produce 2,4,4-trichloro - 3 - fluorobicyclo[3,2,2]nona - 2,6 - diene (molecular weight 241.3).

Example 8

2,4,4 - trichloro - 3 - fluoro - 8 - oxabicyclo[3,2,1]octa-2,6-diene (55.8 grams, 0.25 mole) and boron tribromide 62.3 grams, 0.25 mole) are dispersed in chloroform (150 milliliters). The reaction mixture thus formed is heated at 50° C. for 30 minutes. Following the reaction period, the reaction mixture is poured into ice water whereupon a two phase system comprised of an aqueous phase and an organic phase is formed. The organic phase is separated by decantation and distilled under reduced pressure to obtain the 2,4,4-tribromo-3-fluoro-8-oxabicyclo [3,2,1]octa-2,6-diene product residue having a molecular weight of 362.7.

The following new compounds of the present invention are prepared as described in Example 8:

2,4,4 - tribromo - 3 - chlorobicyclo[3,2,1]octa - 2,6-diene (molecular weight 377.1) by reacting together 2,3,4,4 - tetrachlorobicyclo[3,2,1]octa - 2,6 - diene and boron tribromide.

2,4,4 - tribromo - 3 - chlorobicyclo[3,2,2]nona - 2 - 6-diene (molecular weight 391.1) by reacting together 2,3,4,4 - tetrachlorobicyclo[3,2,2]nona - 2,6 - diene and boron tribromide.

2,4,4 - tribromo - 3 - chloro - 8 - oxabicyclo[3,2,1]octa-2,6-diene (molecular weight 379.1) by reacting together 2,3,4,4 - tetrachloro - 8 - oxabicyclo[3,2,1]octa - 26-diene and boron tribromide.

Example 9

1,3-cyclohexadiene (12.0 grams, 0.15 mole), tetrachlorocyclopropene (17.8 grams, 0.1 mole) and 2,6-di-t-butyl-p-methylphenol (0.5 gram) were dispersed in 30 milliliters of benzene and the reaction mixture thus formed poured into a reaction tube. The air in the tube was purged by the addition of nitrogen and the tube thereafter sealed. The sealed tube and reaction mixture were heated in an oil bath at 80° C. for 3½ days. Following the reaction period, the reaction mixture was distilled under reduced pressure to obtain an oily residue which crystallized upon scratching. The crystals were dried by filtration and dissolved in 50 milliliters of refluxing methanol. The methanol solution was filtered while hot and allowed to cool to room temperature whereupon the product precipitated as a crystalline solid. The crystalline 2,3,4,4-tetrachlorobicyclo[3,2,2]nona-2,6-diene product was recovered by filtration, dried, and the dried product found to melt at 105° to 107° C.

In further operations, 2,3,4,4-tetrabromobicyclo[3,2,2]-nona-2,6-diene (molecular weight 435.6) is prepared by reacting together tetrabromocyclopropane and cyclohexadiene in toluene at a temperature of 25° C. for 5 days.

The new 2,3,4,4-tetrahalobicyclo-2,6-diene compounds of the present invention are useful for the control and kill of various bacterial and fungal organisms in a variety of environments such as soil, soaps, inks, plastics, textiles, woods, paints and the like. For such use, the unmodified compound can be employed. Alternatively, the compound can be dispersed on an inert solid and the resulting product can be employed as a dust. Also, such preparations can be dispersed in water with or without the aid of a wetting agent, and the resulting aqueous dispersions employed as sprays, drenches or washes. In other procedures, the compound can be employed in oil or other solvents or as a constituent in solvent-in-water or water-in-solvent emulsions or as aqueous dispersions thereof which can be applied as a spray, drench or wash. In representative operations, the desired compound was added to a suitable nutrient agar composition. The nutrient agar composition was then poured into a petri plate and allowed to solidify. Following solidification of the agar, the surface was inoculated and the inoculated plates incubated under optimal growth conditions for the organism being tested. As a result of such operations, 2,3,4,4-tetrachlorobicyclo[3,2,1]octa-2,6-diene; 2,3,4,4-tetrachloro-8 - oxabicyclo[3,2,1]octa - 2,6 - diene; 2,3,4,4 - tetrabromobicyclo-[3,2,1]octa - 2,6 - diene and 2,3,4,4 - tetrabromo-8-oxabicyclo[3,2,1]octa-2,6-diene each prevented the growth of *Staphylococcus aureus*, *Candida albicans*, *Salmonella typhosa*, *Mycobacterium phlei.*, *Trichophyton mentagrophytes* and *Candida pelliculosa* when employed in nutrient agar as the sole toxic constituent in an amount sufficient to supply 500 parts per million by weight of the agar composition. In addition, 2,3,4,4 - tetrachlorobicyclo-[3,2,1]octa-2,6-diene, when employed in the nutrient agar as the sole toxic constituent at a rate of 500 parts per million by weight of the total agar composition gave complete kill of *Aerobacter aerogenes*, *Pulluraria pullulans* and *Aspergillus terreus*. In further operations, the 2,3,4,4-tetrachlorobicyclo[3,2,1]octa-2,6-diene has been found to be particularly active as a soil fumigant and seed protectant. In such operations, when added to the soil in a fungicidal amount as a soil drench or soil mix in accordance with the well known methods of soil treatment, 2,3,4,4-tetrachlorobicyclo[3,2,1]octa-2,6-diene gave good protection to plant seeds and seedlings against *Rhizoctania solani*.

The tetrahalocyclopropene starting materials employed in the process of the present invention are produced in accordance with known procedures. (See for example U.S. Pat. No. 3,335,194.)

What is claimed is:

1. A 2,3,4,4-tetrahalobicyclo-2,6-diene compound corresponding to the formula

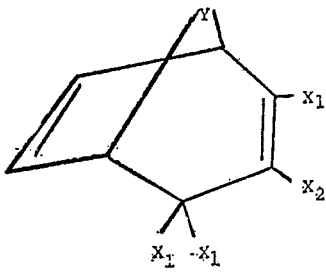

wherein Y represents a member of the group consisting of oxygen, methylene or ethylene, $X_1$ represents a member of the group consisting of chlorine or bromine and $X_2$ represents a member of the group consisting of chlorine, bromine or fluorine with $X_2$ representing bromine only when $X_1$ is bromine.

2. The compound claimed in claim 1 wherein the 2,3,4,4 - tetrahalobicyclo-2,6-diene is 2,3,4,4 - tetrachlorobicyclo[3,2,1]octa-2,6-diene.

3. The compound claimed in claim 1 wherein the 2,3,4,4 - tetrahalobicyclo-2,6-diene is 2,3,4,4 - tetrachloro-8-oxabicyclo[3,2,1]octa-2,6-diene.

4. The compound claimed in claim 1 wherein the 2,3,4,4-tetrahalobicyclo-2,6-diene is 2,3,4,4 - tetrabromobicyclo[3,2,1]octa-2,6-diene.

5. The compound claimed in claim 1 wherein the 2,3,4,4-tetrahalobicyclo-2,6-diene is 2,3,4,4 - tetrabromo-8-oxabicyclo[3,2,1]octa-2,6-diene.

6. The process which comprises reacting a member of the group consisting of cyclopentadiene, cyclohexadiene and furan with a tetrahalocyclopropene selected from the group consisting of tetrachlorocyclopropene, tetrabromocyclopropene and 1,2,3,-trichloro-3 - fluorocyclopropene; said reaction being carried out at a temperature between 0° and 110° C.

7. The process claimed in claim 6 wherein the tetrahalocyclopropene is tetrachlorocyclopropene and the reaction is carried out at temperatures between 0° and 110° C.

8. The process claimed in claim 6 wherein the tetrahalocyclopropene is tetrabromocyclopropene and the reaction is carried out at temperatures between 0° and about 80° C.

9. The process claimed in claim 6 wherein the tetrahalocyclopropene is 1,2,3-trichloro-3-fluorocyclopropene and the reaction is carried out at temperatures between 0° and 110° C.

References Cited
UNITED STATES PATENTS 3,284,444   11/1966   Franz _____ 260—345.1 XR HENRY R. JILES, Primary Examiner J. M. FORD, Assistant Examiner U.S. Cl. X.R.

260—648, 999